United States Patent [19]

Shorr et al.

[11] Patent Number: 4,849,467
[45] Date of Patent: Jul. 18, 1989

[54] FLAME RETARDANT POLYMER COMPOSITIONS

[75] Inventors: Leonard M. Shorr; Theodor M. Fishler, both of Haifa; Pierre Georlette, Omer; Michael Rumack, Beer-Sheva, all of Israel

[73] Assignee: Bromine Compounds Ltd., Beer-Sheva, Israel

[21] Appl. No.: 202,029

[22] Filed: Jun. 2, 1988

Related U.S. Application Data

[63] Continuation-in-part of Ser. No. 927,164, Nov. 5, 1986, abandoned.

[30] Foreign Application Priority Data

Nov. 25, 1985 [IL] Israel ............................. 77130

[51] Int. Cl.$^4$ ............................................. C08K 5/34
[52] U.S. Cl. ..................................... 524/104; 521/147; 524/412
[58] Field of Search ................... 524/104, 412; 521/147

[56] References Cited

U.S. PATENT DOCUMENTS

| | | | |
|---|---|---|---|
| 3,557,132 | 1/1971 | Hermann et al. | 524/104 |
| 3,890,270 | 6/1975 | Minieri | 524/94 |
| 4,318,730 | 3/1982 | Mori et al. | 71/65 |
| 4,508,883 | 4/1985 | Younes | 526/262 |
| 4,563,209 | 1/1986 | Mori et al. | 71/67 |
| 4,607,081 | 8/1986 | Younes | 524/548 |
| 4,609,711 | 9/1986 | Younes | 526/262 |
| 4,626,573 | 12/1986 | Younes | 524/516 |
| 4,661,574 | 4/1987 | Younes | 524/548 |

OTHER PUBLICATIONS

Rhys, "Flame Retarding of Plastics Materials," Chemistry and Industry, Feb. 15, 1969, pp. 187–191.
Schmidt, "Flame-Retardant Additives in Plastics and Recent Related Patents," Chemical Abstracts, vol. 64, 1966, p. 8391.
Khanna et al., "Flammability of Polymers," American Chemical Society, Symposium Ser. 1985, Applied Polym. Sci. (2nd Ed.) pp. 311–313, 318–319.
Pitts, "Antimony-Halogen Synergistic Reactions in Fire Retardants," J. Fire Flammability, 1972; pp. 51, 74, 77, 82–84.

*Primary Examiner*—John Kight
*Assistant Examiner*—Kriellion Morgan
*Attorney, Agent, or Firm*—Foley & Lardner, Schwartz, Jeffery, Schwaab, Mack, Blumenthal & Evans

[57] ABSTRACT

The present invention relates to fire retardant polymer compositions obtained by the blending of monomeric N-tribromophenylmaleimide, as a fire retardant additive with a polymer. The preferred amount of bromine in the composition is above 0.5% by weight thereof. The polymer is selected from styrenic polymers and copolymers, polyolefine, rubbers, epoxy resins, plasticized PVC and polyurethane. If desired, one or more additional fire retardant(s) may be incorporated in the composition. Optionally, synergistic fire retardant additives such as antimony oxide, or organo-phosphorus compounds are also incorporated. The flame retardant polymer compositions have improved properties compared with those obtained with known flame retardant reagents. It was also unexpectedly found that the fire retardant additive provides to the polymer composition stability against ultraviolet light irradiation.

14 Claims, No Drawings

FLAME RETARDANT POLYMER COMPOSITIONS

The present invention relates to flame retardant polymer compositions. More particularly, the invention relates to flame retardant polymer compositions containing an unreacted monomeric halo-derivative as an additive type flame retardant reagent.

Halogen containing compounds are commonly used for the fire retardation of numerous polymeric materials. Such fire retardants, depending on their chemistry, can be applied in two forms; as an active or as an additive type reagent in the plastic material. An active fire retardant is one that interacts chemically with the substrate, so that it becomes permanently incorporated into the polymer structure. The use of an additive retardant does not involve any chemical interaction between the fire retardant and the polymeric substrate, the additive being simply dissolved or dispersed in the polymer matrix and therefore it can be lost from the substrate in various ways. Typical examples of the latter are materials with appreciable vapor pressure which may vaporize out, incompatible materials which bleed and soluble materials which can be leached out. Therefore, it is clear that where the chemical and physical properties of the polymer permit, an active fire retardant is generally preferable.

It is commonly recognized in the field of fire retardant technology that the efficacy of an active fire retardant is greater than of an additive fire retardant material. However, it is usually more difficult to find an effective, active type fire retardant which does not adversely affect the polymer properties than in the case of fire retardants used as simple additives. The latter materials are more easily incorporated into the plastic mass and are generally more versatile, both with respect to substrate choice and concentration levels employable. The latter point is particularly important, since these reagents are often more expensive than the polymer itself and not every application requires the same degree of fire retardation. Thus the amount to be added is optimally variable.

The mode of action of fire retardant additives on the combustion of plastic materials containing them is a complex process which is not completely understood. In a few cases, it appears that flame retardants function by actually increasing the thermal stability of the polymer into which they are incorporated. In other cases, it appears that the flame retardant is no more than a heat sink, passive, such as a filler-like material. In this manner, the fire retardant prevents the substrate from reaching its breakdown temperature, at which combustible gases are produced. Other fire retardants produce insulating layers on the surface of the heated specimen, or produce hydrogen halides which inhibit the oxidaton process which takes place in the vapor phase.

The use of additive type fire retardants is known. There are a number of patents dealing with this subject. Thus, according to U.S. Pat. No. 4,508,883 (U. E. Younes) claims an additive flame retardant consisting of an alternating copolymer containing tribromophenyl-succinimide units which alternate with bromophenylethane units in a unique copolymeric structure. As appears from the patent, the starting materials for preparing the flame retarding additive indeed comprise tribromophenyl maleimide, but in the product the heterocyclic ring is converted into a succinimide moiety as a result of the reaction involved with the other compounds. As known from prior art, such alternating copolymers are nonvolatile, very thermally stable materials and combust leaving large amounts of char residue. Char residue formation is an effective means of fire retardation.

The use of additive fire retardant reagents is also disclosed in the U.S. Pat. No. 4,607,081—a division of the previous patent—the reagent consisting of an alternating copolymer made from brominated styrene and N-brominated phenylmaleimide.

Moldable compositions which contain copolymeric fire retardant reagent derived from randomly polymerized N-(chlorinated or brominated phenyl) maleimide are described in U.S. Pat. No. 4,609,711. As mentioned therein, "the number average molecular weight of the copolymers should be at least 30,000 and preferably 80,000 to about 500,000". Thus, these are high molecular weight polymers.

In our previous U.S. patent application Ser. No. 859,784 there were claimed fire retardant polymer compositions comprising non-linear structural configurations produced by the reaction of N-tribromophenylmaleimide with or without comonomers, with a preformed backbone polymer, the bromine content in said composition being at least 1.2% by weight bromine.

It has now surprisingly been found that N-tribromophenylmaleimide in its monomeric form (hereinafter refered to as TBPMI), despite the fact that it is completely volatile and loses about 90% of its weight below 270° C. when heated alone, is an effective fire retardant when used in its unpolymerized form, i.e. in the additive mode with respect to a variety of polymeric substrates even though these may degrade at much higher temperature. Thus, the invention consists of fire retardant polymer compositions, containing at least one polymer selected from styrenic polymers and copolymers, polyolefins, epoxy resins, rubbers, plasticized PVC and polyurethanes and a fire retarding amount of a fire retardant additive consisting essentially of monomeric TBPMI. It was found that even an amount of bromine in said composition of at least 0.5% will impart flame retardancy to the polymer substrate.

The term monomeric N-tribromophenylmaleimide (TBPMI) as used in the present specification means the monomer itself completely free of any homopolymer or copolymer.

The data of the thermal gravimetric analysis of TBPMI are given in the following Table 1.

TABLE 1

Data on the thermal gravimetric analysis of TBPMI.

| Weight loss (%) | Temperature degree C. |
| --- | --- |
| 1 | 181 |
| 5 | 205 |
| 10 | 220 |
| 90 | 270 |

From the above Table, it is seen that TBPMI is substantially completely eliminated at temperatures below 270° C. and it does not leave char residue. Thus, it is quite surprising that TBPMI in its monomeric form acts as an excellent fire retardant additive for certain types of polymers even though these polymers themselves decompose at temperatures above 270° C. Furthermore, its effectiveness as a fire retardant additive stands in contrast to prior art statements that the efficiency of a fire retardant depends on the perfect matching of its decomposition temperature to that of the substrate (W. G. Schmidt, Trans. J. Plastics Inst. 33 (108) 247 (1965). This has also later been referred to as "the right place right time theory" (J. A. Rhys, Phys. Chem, Ind., 1969, 187). For example, when utilizing TBPMI with polyurethane foams, according to the thermal gravimetric analysis it would appear that TBPMI would substantially completely diaappear before the foam would begin to decompose upon heating, and would no longer be present when combustible vapors emanating from the polymers ignite.

According to the present invention, it has been found that TBPMI in its monomeric form is in particular suitable for fire retardation simply by blending it with polystyrene (whose degradation sets in at 330° C.), polyurethane (whose degradation sets in at 325° C.) epoxy resins, ABS resins and polyolefins such as polypropylene (which decompose above 350° C.). This usage is completely different from the Younes Patents cited in the preamble, wherein tribromophenylameimide is first chemically reacted with other monomers and then the polymeric product is mixed with a polymer. To demonstrate this difference, a flame retardant additive of the type described in Example 2 of the U.S. Pat. No. 4,508,883 was prepared. The physical properties of the polymer were tested and found to be as follows:

Softening point (as determined on Fisher-Johns m.p. apparatus): >290° C.
Soluble in bromobenzene.
Insoluble in acetone.
Bromine number, zero (within experimental error).

The thermal gravimetric analysis (determined in nitrogen at a heating rate of 10 deg/min) had the following characteristics:
Temperature of decomposition initiation: 340° C.
Temperature at the end of weight loss: 449° C.
Weight of residue at 500° C.: 53.8%.

It can thus be seen that the copolymers described in the above patent do not even begin to lose weight at temperatures above those marking the complete volatilization of TBPMI. Based on the "right time right place" theory, they could not have been foreseen to be suitable for the fire protection of the same polymers. Furthermore, the char residue found for this Younes copolymer confirms the theory that char formation is a major factor in the fire protection they offer. In contrast, TBPMI in its monomeric form leaves no char residue and is substantially eliminated below 270° C.

The precise mode of action of TBPMI as an additive flame retardant reagent, has not yet been completely elucidated. It may be assumed that the reagent, largely independent of the nature of the plastic material, acts particularly in the condensed phase and possibly chemically inhibits the free radical reactions involved when the polymer decomposes under thermal stress. Of course this may be only one of the explanations for the effectiveness of this reagent to which the inventors should not be bound, since other mechanisms might be involved. The fact that TBPMI was found to be effective as an active flame retardant (see our previous patent application Ser. No. 859,784) cannot serve to predict anything in respect to its effectivness as a simple additive. One of the reasons for this is that the rate of decomposition of an additive type fire retardant is independent of its concentration in the substrate. This is not the case when the reagent is of the active type, becoming part of the polymer structure.

The relative proportions of TBPMI to be incorporated as additive reagent into the plastic material to be rendered flame retardant, may be varied over a broad range, depending on the respective plastic material, the required mechanical properties as well as on the desired extent of flame retardancy. In order to optimize the best combinations of good processing and performance properties (e.g. high tensile strength) with fire retardancy it is preferred to obtain products containing from 0.85% to 50% by weight of TBPMI, the lower limit at which some effect is reached being 0.5% by weight bromine.

The present invention is particularly related to TBPMI, although one may conceive to utilize other halogen derivatives of N-phenylmaleimide.

The compositions according to the present invention may be prepared by any of the conventional techniques of blending which provide efficient mixing of the ingredients.

Another advantageous property of TBPMI is the stability against ultraviolet light irradiation imparted to the polymer. This property is quite unexpected and could not have been foreseen.

As known in the art, a serious problem with polymeric materials fire retarded with halogen compounds is their aggravated sensitivity to ultraviolet light irradiation which discolors the products. It has been surprisingly found according to the present invention, that TBPMI-protected samples are far less sensitive to this deficiency (see Examples 4 and 9), compared with decabromodiphenyl oxide which is a well-known fire retardant and the copolymer prepared according to U.S. Pat. No. 4,508,883.

Although the flame retardant polymer compositions obtained by the incorporation of TBPMI as flame retardant additive, according to the present invention, are by themselves very efficient, one may further enhance their effectiveness by including one or more synergists conventionally used in flame retardation. These synergistic compounds include organo-phosphorus compounds, oxides, sulfides or organic salts of antimony, boron, arsenic or zinc borate. The preferred synergistic compounds for use in the compositions of this invention are organo-phosphorus compounds and antimony oxide. For some purposes, it might be desirable to incorporate an additional flame retardant in order to obtain a particular property. Also other common plastic ingredients such as fillers, pigments, lubricants, smoke suppressants, plasticizers etc. may be incorporated.

Although blooming is a common deficiency of monomeric and low molecular weight polymeric additives, TBPMI used as fire retardant additive according to the present invention exhibits this deficiency only to a slight degree. On the other hand, the high molecular weight additives such as those derived from a brominated phenylmaleimide as described in the U.S. Pat. No. 4,607,081, do not bloom.

While particular embodiments of this invention have been described, it will be evident to those skilled in the art that the present invention may be embodied in other specific forms without departing from the essential characteristics thereof. The present embodiments and the Examples presented below are, therefore, to be considered in all respects as illustrative and not restrictive, the scope of the invention being indicated by the appended Claims rather than by the foregoing description and all changes which come within the meaning and range of equivalency of the Claims are therefore intended to be embraced therein.

The invention will be hereafter described by the following Examples without being limited thereto. All the amounts in the Examples are expressed in weight percentages unless otherwise stated.

EXAMPLE 1

Inclusion in a Polyurethane Foam

A sorbitol-based polyether polyol (1.38 g) with an hydroxyl number of 490 mg KOH/g was mixed with 12.2 g. TBPMI, 15.8 g. Santicizer 141 (an alkyl-aryl phosphate produced by Monsanto), 0.25 g. water, 1.0 g. of a silicone surfactant and 1.0 g. of dimethylcyclohexylamine as catalyst. When homogeneous, 15.0 g. of Freon 11 were added and the mxture stirred vigorously for 45 seconds. Diphenylmethane diisocyanate (MDI, 51.2 g) was then added and stirring was continued for 5 seconds more. The mixture was poured into a cardboard box lined with wrapping paper and left to rise freely. The cream time (measured from the moment of MDI introduction) was 35 seconds while the rise time was 275 seconds.

The foam obtained had a limiting Oxygen Index of 23.1 versus 18.6 for the blank foam, i.e. containing no TBPMI.

EXAMPLE 2

Inclusion in an Epoxy Resin

The following ingredients were mixed and then heated to melting:
20.0 g. Epoxy Resin (Araldite AW 106, produced by Ciba Geigy);
5.85 g. TMPMI;
6.56 g. Nadic anhydride [Dicylo (2,2,1)-5-heptene-2,3-dicarboxylic anhydride], as hardener.

Then 0.2 g. of N,N-dimethylaniline was added as catalyst and the mixture was cast into a Teflon mold. Curing was completed at 120° C. for 24 hours. The Limiting Oxygen Index (LOI) of the product was 23.2 versus 18.7 for a parallel run without TBPMI.

EXAMPLE 3

Inclusion in an ABS Resin

The following ingredients were mixed and extruded in a Minimax Mixer-Extruder (Manufactured by Custom Instruments):
18.5 g. TBPMI;
76.9 g. ABS resin (Ronfalin T-PWD NAT 0001 produced by DSM);
4.6 g. Antiomony oxide.

The ribbons thus produced were disintegrated in a blender. The resulting flakes were pressed into 3 mm plates at 240° C. These were found to have a UL 94 rating of V-O. The ABS containing no added fire retardant was rated as "Burning" by the same test.

EXAMPLE 4

Inclusion in a High Impact Polystyrene (HIPS)

A blend consisting of 600 g. was prepared from HIPS (produced by Israel Petrochemicals Ltd.) and the ingredients as given in the following Table 2, and introduced in a Brabender heated at 190° C. and mixed for 10 minutes. The resulting flame retardation is given in Table 2.

TABLE 2

| HIPS with TBPMI as fire retardant additive. | | |
|---|---|---|
| Constituents | Parts by weight | |
| HIPS | 100 | 100 |
| TBPMI | 11.6 | 18.6 |
| Antimony Oxide | 2.3 | 3.7 |
| % Br | 6 | 9 |
| Flame retardancy (UL 94) | V-2 | V-O |

As appears from the above Table, a blend containing 9% bromine results in a V-0 rated flame retardant composition.

The excellent UV stability imparted by TBPMI in its monomeric form can be seen in the following comparison between parallel samples of HIPS (Galirene H 88/5 ex Israel Petrochemical Enterprises Ltd.) fire retarded on the one hand by decabromodiphenyl oxide (Deca) and by TBPMI on the other. Both samples contained 8% Br and 8% antimony oxide.

| Sample | U.V. Aging (DE) color Versus White in hours | | | | |
|---|---|---|---|---|---|
| | 0 | 5 | 10 | 25 | 50 |
| Protected by Deca* | 9 | 28 | 32 | 38 | 41 |
| Protected by TBPMI | 12 | 15 | 21 | 33 | 38 |

The excellent color retention of the TBPMI sample is immediately clear from the results of the above test
*(Deca = Decabromodiphenyl oxide produced by Bromine Compounds Ltd.).

EXAMPLE 5

Inclusion in a Polyolefin Resin

The following components were blended for 15 minutes at 190° C. in a Brabender plasticorder.

| Component | Wt. % in compound |
|---|---|
| IPETHENE 310 (Trade Mark, low density polyethylene produced by Israel Petrochemical Enterprises, Ltd.) | 63 |
| Antimony Oxide | 12 |
| TBPMI | 25 |

The blend was pressure molded at 190° C., first for one minute at 20 atmospheres, and then for 12 minutes at 120 atmospheres. Samples cut from these pressed plates were tested and rated V-2 according to the UL-94 standard test. By comparison, a non-fire retarded sample burned and was therefore non-rated.

EXAMPLE 6

Inclusion in a Polyurethane Rubber

The following components were blended and melt compounded in a Brabender plasticorder over a temperature range of 140°–180° C., cooled to 120° C. and then press molded to provide samples for testing.

| Component | wt. % in compound |
|---|---|
| Estane 58277 (Trade Mark of Goodrich polyester-based thermoplastic polyurethane) | 74.8 |
| Antimony oxide | 8.0 |
| TBPMI | 17.2 |

This composition was non-burning and non-dripping in the UL-94 test and is therefore rated V-0. By comparision, a non-fire retarded sample burned, and was therefore non-rated.

EXAMPLE 7

The experiment as in Example 1, was repeated, but the TBPMI content was reduced to only 0.9 g. The oxygen index of the resulting foam was found to be 21.8 (compared to 18.6 for the blank).

EXAMPLE 8

The experiment as in Example 1, was repeated, without the incorporation of the synergist fire retardant Santicizer 141 and the bromine content was only 0.5% (introduced as TBPMI). The oxygen index in this case was 18.8. Although there is only a small difference from the blank (18.6) this is significant for a polyurethane foam.

EXAMPLE 9

A series of accelerated UV stability tests were performed on 3 samples comparing the performance of the copolymer prepared according to Example 2 of U.S. Pat. No. 4,508,883, decabromodiphenyl oxide (Deca) and the monomeric TBPMI according to the present invention with HIPS (Galirene H 88/5 produced by Israel Petrochemical Enterprises Ltd.)

All three samples contain the same bromine level of 10.1% Br. The tests were carried out on a Techno Instrument Spectrometer SCM 90.

The results were as follows:

| Sample | U.V. aging (DE) color versus white After: | |
|---|---|---|
| | 5 hours | 10 hours |
| Protected by Deca | 27.6 | 31.5 |
| Protected by the copolymer descirbed in U.S. Pat. No. 4,508,883 | 24.9 | 29.6 |
| Protected by TBPMI (monomer) | 13.6 | 20.9 |

The results clearly indicate the better protection imparted by the monomer TBPMI.

EXAMPLE 10

An experiment was carried out to prove that TBPMI in its monomeric form as in the present invention, when used as an additive fire retardant is not chemically bonded to the polymeric substrate, nor is it homopolymerized. HIPS (Galirene H88/5) was blended with monomeric TBPMI and antimony oxide in a Brabender blender as described in previous Examples, using the following proportions of components:

| HIPS | 74.8 g. |
|---|---|
| Timonox White Star | 8.0 g. |
| TBPMI | 17.2 g. |

The blend was then comminuted and extracted with acetone in a Soxhlet extraction apparatus until the liquid refluxing to the receiver showed the same refractive index as pure acetone (1.3585 D at 20° C.). On evaporation of the acetone, 17.1 g. of solid remained, having the following properties:

m.p.: 142° C. (the same value as mentioned in the literature for monomeric TBPMI).

Bromine nubmer: 38.5 (calc'd. for monomeric TBPMI —39.0).

Proton NMR (d6-DMSO): 8.2(s), 7.4(s)

The relative viscosity of this residue was determined in toluene using a Cannon Fenske apparatus at 32.4° C. The flow time of the 0.1% (w/v) solution containing the sample was 144.8 sec compared with 148.0 sec for the toluene itself. The above results clearly show that the residue is not polymeric.

For comparision, this experiment was repeated with a flame retarding polymeric additive prepared as described in Example 2 of U.S. Pat. No. 4,607,081 in place of the monomeric TBPMI used above, but in a quantity to provide the same level of bromine in the blend (10%). Soxhlet extraction with acetone yielded virtually no residue.

These results confirm the description given in said Example that the monomers used to make this polymeric additive are soluble in acetone, whereas the polymer is not.

We claim:

1. A fire retardant polymer composition, containing at least one polymer selected from the group consisting of styrenic polymers and copolymers, polyolefins, epoxy resins, rubbers, plasticized PVC and polyurethanes blended with a fire retarding amount of a fire retardant additive consisting essentially of monomeric TBPMI.

2. Fire retardant polymer composition, according to claim 1, wherein the bromine content is above 0.5% by weight of the composition.

3. Fire retardant polymer composition according to claim 1, wherein the TBPMI is in the range of 0.85% to 50% by weight of the composition.

4. Fire retardant polymer composition according to claim 1, further comprising at least one additional fire retardant incorporated therein.

5. Fire retardant polymer composition according to claim 1, further comprising at least one synergistic fire retardant reagent incorporated therein.

6. Fire retardant polymer composition according to claim 5, wherein said synergistic fire retardant reagent is selected from organo-phosphorus compounds and antimony oxide.

7. Fire retardant polymer composition according to claim 1, wherein conventional additives selected from fillers, pigments, lubricants, smoke suppressants, plasticizers and carbon black are incorporated.

8. Fire retardant polymer composition according to claim 1, wherein the amount of TBPMI is sufficient to provide the polymer composition with stability against ultraviolet light irradiation.

9. Fire retardant polymer composition according to claim 8, wherein said polymer is polystyrene.

10. Fire retardant polymer composition according to claim 8, wherein said polymer is high impact polystyrene (HIPS).

11. Fire retardant polymer composition according to claim 8, wherein said polymer is polyethylene.

12. Fire retardant polymer composition according to claim 8, wherein said polymer is polyurethane rubber.

13. Fire retardant polymer composition according to claim 8, wherein said polymer is polyurethane foam.

14. Fire retardant polymer composition according to claim 8, wherein said polymer is ABS polymer.

* * * * *